United States Patent [19]

Yano

[11] 4,039,245

[45] Aug. 2, 1977

[54] METHOD FOR PREPARING A HOLOGRAM

[75] Inventor: Akio Yano, Kawasaki, Japan

[73] Assignee: Canon Kabushiki Kaisha, Tokyo, Japan

[21] Appl. No.: 626,348

[22] Filed: Oct. 28, 1975

Related U.S. Application Data

[63] Continuation of Ser. No. 485,628, July 3, 1974, abandoned, which is a continuation of Ser. No. 418,935, Nov. 26, 1973, abandoned, which is a continuation of Ser. No. 134,729, April 16, 1971, abandoned.

[51] Int. Cl.$^2$ .............................................. G03H 1/30
[52] U.S. Cl. ................................................... 350/3.5
[58] Field of Search ....................................... 350/3.5

[56] References Cited

U.S. PATENT DOCUMENTS 3,608,993   9/1971   DeBitteto .............................. 350/3.5

*Primary Examiner*—Ronald J. Stern
*Attorney, Agent, or Firm*—Toren, McGeady and Stanger

[57] ABSTRACT

A hologram is produced by arranging a plurality of two-dimensional pictures in a predetermined pattern, illuminating each of the two-dimensional pictures with a coherent beam, projecting light emerging from each of the two-dimensional pictures to a screen, a dispersing light on the screen in one direction parallel to the screen and redirecting the light along predetermined courses in the direction parallel to the screen but orthogonal to the one direction so as to form overlapping images of the two-dimensional pictures on the screen. The light from each picture is then redirected onto different positions of a holographic recording medium, and a reference beam is directed toward the medium so as to produce interference with the light from the screen. In one embodiment the screen reflectively disperses the light in the vertical direction and redirects it retroreflectively in the horizontal direction.

9 Claims, 9 Drawing Figures

FIG.3A
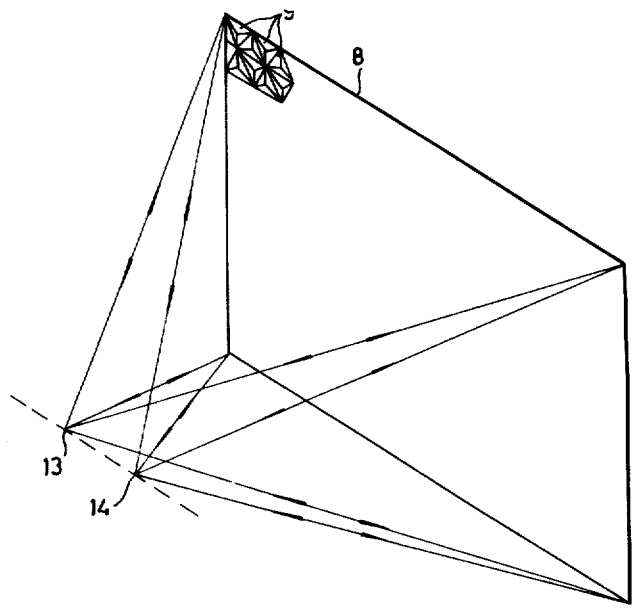
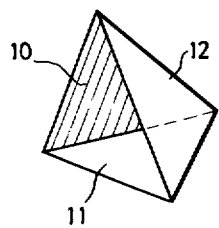
FIG. 3B

METHOD FOR PREPARING A HOLOGRAM

This is a continuation of application Ser. No. 485,628, filed July 3, 1974, which in turn was a continuation of application Ser. No. 418,935, filed on Nov. 26, 1973, which in turn was a Continuation of application Ser. No. 134,729, filed Apr. 16, 1971 which are all now abandoned.

BACKGROUND OF THE INVENTION

The present invention relates to methods and means for preparing a hologram, and particularly for preparing a synthetic hologram.

A synthetic hologram is prepared by using a number of positive pictures taken with natural light and bearing image information about an object to be recorded. Such synthetic holograms are particularly useful for recording large objects or scenery.

When conventional methods are used, it is difficult to prepare a synthetic hologram from many positive pictures, each having different image information, because of the complexity of the mechanical structure needed to obtain the multiple exposures and carry out the process.

One of the objects of the present invention is to provide a method for preparing a hologram by which the hologram is easily prepared even when many recording media such as positive pictures having image information on which the object is recorded are used.

Another object of the present invention is to provide a method for preparing a hologram by which a reconstructed image can be seen in three dimensions.

Still another object of the present invention is to provide a method for preparing a hologram by which a cubic reconstructed color image can be observed.

SUMMARY OF THE INVENTION

According to a feature of the invention, these objects are attained in whole or in part, by arranging a plurality of two-dimensional pictures along a predetermined pattern, illuminating each of the two-dimensional pictures with a coherent light beam, projecting light emerging from each of the two-dimensional pictures onto a screen that disperses light in only one orthogonal direction parallel to the screen and redirects light along predetermined courses in the other orthogonal direction parallel to the screen so as to form overlapping images of the two-dimensional pictures on the screen, directing the light from different images onto different positions on a holographic recording medium, and directing a reference beam toward the medium so as to produce interference with the light from the screen.

These and other features of the invention are pointed out in the claims forming a part of the specification. Other objects and advantages of the invention will become evident from the following detailed description when read in light of the accompanying drawings.

FIGS. 3A and 3B show a cubic corner screen used in an embodiment of the present invention.

Figure 1:
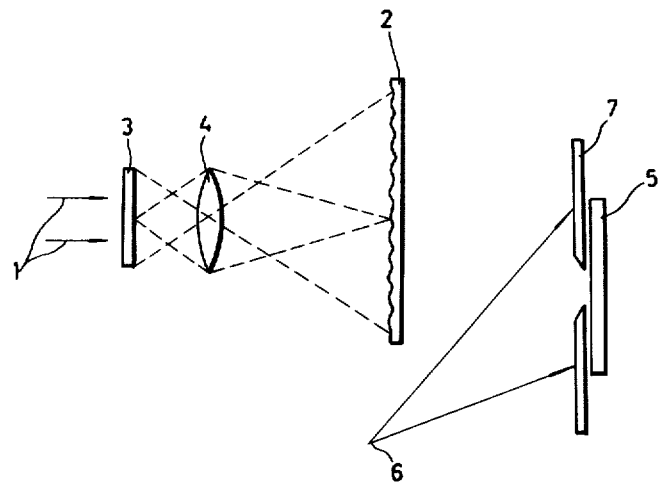
FIG. 1 shows a conventional method for preparing a composite lensless Fourier hologram using multiple exposures.

In FIG. 1 which shows the preparation of a lensless Fourier conversion type hologram using multiple exposures, the positive 3 having image information illuminated with a coherent light beam 1 and is image-formed on a diffusion member 2. The fringes having the image information diffused by the diffusion member 2 interact with the reference beam 6 on the recording medium 5 and recorded as a hologram. At this time, a slit 7 is positioned immediately before the recording medium 5 so that a hologram of a certain limited width in respect to one positive image is obtained. When a hologram is prepared by replacing positive images one by another and moving the slit correspondingly, a synthetic hologram in which holograms are arranged in a mosaic structure is obtained. As the point light source of the reference beam is positioned on the same plane as the diffusion member, the hologram obtained is of the lensless Fourier transform type.

In the above embodiment of a conventional method, because a diffusion member is used, a slit is required and the multiple exposures can not be avoided.

Figure 2:
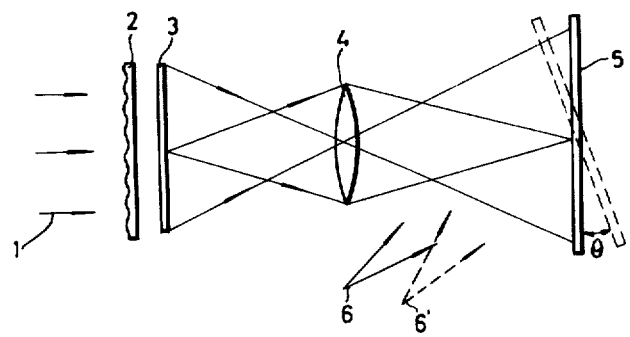
FIG. 2 shows a conventional method for preparing a composite image hologram using multiple exposures.

FIG. 2 shows a conventional method of preparing a composite image hologram using multiple exposures. Here, reference numeral 1 denotes a coherent beam such as a laser beam, and 2 is a diffusion member arranged in the path of the coherent to beams cause diffusion of the coherent beams, 3 is a positive on which an object is recorded by natural light by an ordinary photographing means, 4 is an optical system for image formation, 5 is a dry plate positioned near the focal plane of the image formation optical system 4, and 6 is a reference beam.

To prepare a synthetic hologram for a three-dimensional image with the above arrangement, the positive 3, illuminated by the coherent beam 1 through the diffusion plate 2, is image-formed near the dry plate 5 by the optical system 4. Interference patterns produced on the dry plate 5 by projecting the reference beam 6 are recorded. For example, for preparation of a hologram for a three dimensional image, the positive 3 is replaced by another positive (not shown) having different parallax and interference patterns. These are recorded on the dry plate 5 in a similar way. At this time, the dry plate 5 is rotated with respect to the optical axis as shown in FIG. 2 by an angle $\theta$ so as to avoid mixing of the information of by the parallax of the original positive 3 with the information of by the parallax of the new positive. Also in order to maintain the incident angle of the reference beam to the dry plate at a constant angle, it is necessary to change the position of the reference beam in correspondence to the rotation of the dry plate. The hologram which is recorded on the focal plane of an image forming optical system by replacing positives one after another as described above is called a synthetic image hologram.

However, the conventional method shown in FIG. 2 has a defect that it requires a very complicated operation for replacing the positives or for changing position of the dry plate and the reference beams.

The method for preparing a hologram according to the present invention will be explained referring to FIG. 3 to FIG. 6 which show respectively a screen of specific nature used in the method of the present invention. The screens may be classified by their functions into a direction-selective screen, a unidirection selective screen and a radially direction-selective screen.

The direction-selective screen is constructed such that a divergent light from a single point in space is reflected on or transmitted through the screen and is again condensed onto the point or another point in the space. As examples of this type of screen, a cubic corner screen and a large aperture lens screen may be mentioned. The cubic corner screen will be explained by referring to FIG. 3(A), in which 8 is a cubic corner screen composed of a close arrangement of many small cubic corners 9 having three reflecting surfaces at right angles to each other. As shown in FIG. 3(B), in the case of a cubic corner in which three reflecting surfaces 10, 11 and 12 are arranged at right angles to each other as the three planes of the rectangular coordinates, the incident light tends to turn back in the direction of incidence and thus the beams coming from one point are condensed again onto the same point. Namely the beams coming out from the point 13 are condensed back again to the point 13, and the beams coming out from the point 14 are condensed back again to the point 14.

Figure 4:
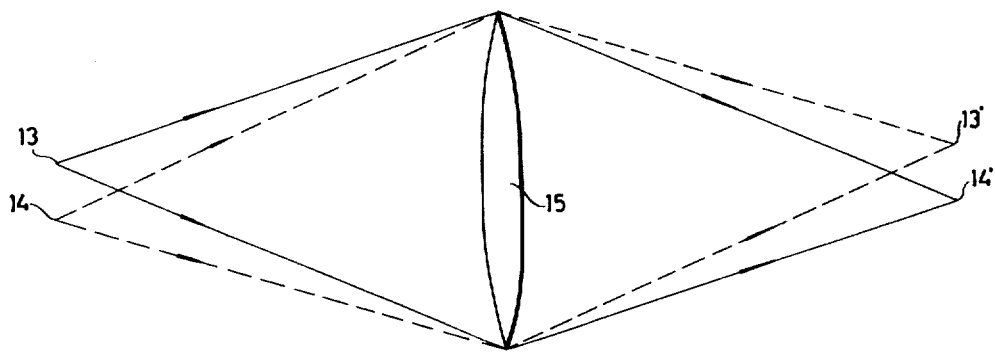
FIG. 4 shows a large aperture lens screen used in an embodiment of the present invention.

In FIG. 4, the numeral 15 denotes an optical apparatus functioning as a large aperture lens. Since it performs at least some functions of the screens in the other embodiments it is referred to herein as a lens screen. Beams coming out of the points 14 and 13 are condensed onto other points 13' and 14' respectively through the image formation action of the lens.

Figure 5:
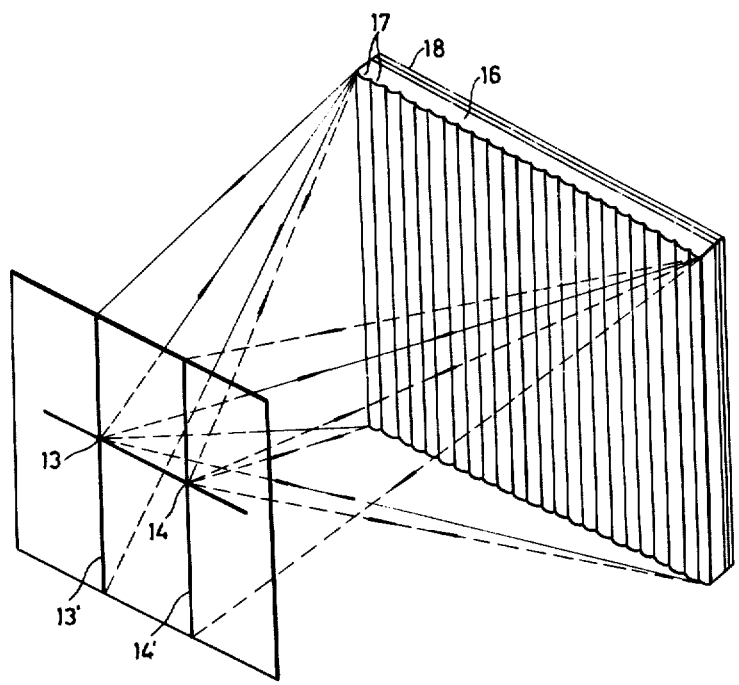
FIG. 5 shows a lenticular screen used in an embodiment of the present invention.

This unidirection selective screen is such that the divergent beams coming from one point in the space are condensed in a straight line within a plane which includes the point and is parallel to the screen, or are condensed in a straight line within a certain plane parallel to the screen in the space. A typical example of this type is a lenticular screen. The lenticular screen will be explained referring to FIG. 5. Here is a lenticular screen 16 provided with a diffusion reflecting surface 18 on the focal plane with respect to the infinite distance of many small cylindrical lenticular lenses 17. Beams from the points 13 and 14 are directed to lenticular lenses 17, but as the focal length of these lenses are small, the incident light beams can be considered almost parallel. Therefore, the lenticular lenses produce two line images corresponding to the positions of the points 13 and 14 on the diffusion reflecting surface on the focal plane with respect to the infinite focal distance of these lenses and these line images are diffused and reflected in a counter direction to the direction of incidence, namely in a direction towards their origin. The same thing can be said for all of the small cylindrical lenticular lenses forming the lenticular screen, and thus this screen has a tendency of turning back the incident light in its incident direction. But the incident light is merely diffused and reflected and is given no orientation in the direction along the generating line of the cylindrical lenticular lens (in a lengthwise direction in the drawings), and thus the beams from the points 13 and 14 expand in one direction in a diffused state and are condensed on the linear portions 13' and 14'. The screen shown in FIG. 5 is a screen of the reflection type.

In the case of a transmission type of lenticular screen in which a diffusion transmitting plane is positioned between two lenticular plates, the light is condensed in a linear line including points synmetrical to the projecting point of the light with respect to the plane of the screen.

The radially direction selective screen is such that a divergent light beam from one point in space is reflected by or transmitted through the screen and then is condensed in a straight light connecting that one point and a special point in the space determined by the shape of the screen. As a typical example of this type of screen a radial slit screen may be mentioned.

Figure 6:
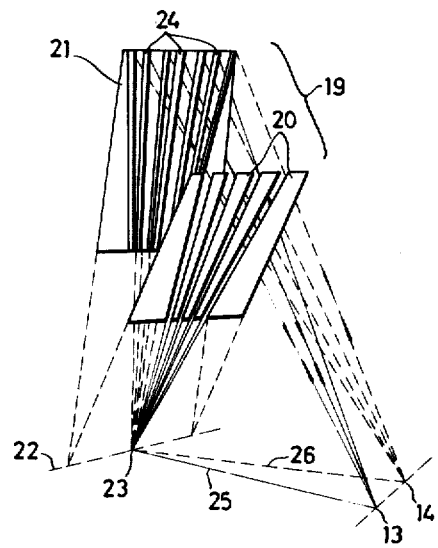
FIG. 6 shows a radially direction selective screen used in an embodiment of the present invention.

Functions of this screen will be explained by referring to FIG. 6, in which 19 indicates slit screens arranged radially, which are composed of a plurality of minute slits and diffusion reflecting planes in combination. The slits 20 are arranged so as to cross each other at one point 23 on the cross line 22 of the screen and the diffusion reflecting plane 21, and the width of the slits increases with increasing distance from the point 23. The divergent beam from one point 13 enters the slit 20 and is condensed on the diffusion reflecting plane 21 in images 24 radially extending from the point 23. This condensed beam is diffused and reflected back in its original direction, when the beam is in a plane including the center line made by the point source 13 and the individual minute slit 20. As the plane crosses with the straight line 25 connecting the point 23 and the point 13, the reflected beam is condensed on this line. Therefore, when the viewer's eye is on the straight line 25, the viewer can always view the whole screen. Similar things can be said in connection with the other point 14; the reflected beam is condensed on the straight line connecting the point 23 and the point 14.

The aforementioned describes four typical but different screens. These screens represent only a few of the examples of the various special screens having the directional capability described above. Essentially, the screen may be described as dispersing light in predetermined directions parallel to the screen and redirecting light along given courses in other directions parallel to the screen. For example, the screen in FIG. 5 disperses light in the vertical direction parallel to the screen and retroreflects light in the horizontal direction parallel to the screen.

Figure 7:
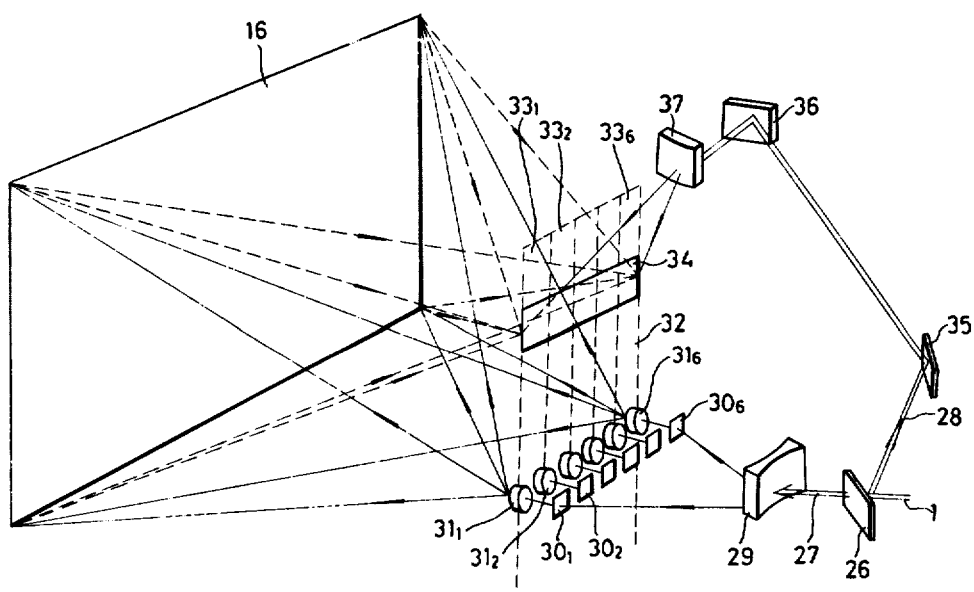
FIG. 7 shows a first embodiment of the present invention.

FIG. 7 illustrates one embodiment of the present invention utilizing a lenticular reflection screen of the type shown in FIG. 5. In FIG. 7, a coherent beam 1 is split into two beams 27 and 28 by a beam splitter 26. A cylindrical lens 29 expands the beam 27 along one direction. The expanded beam 27 passes through a plurality of positive transparencies $30_1$, $30_2$ ... $30_6$ bearing image information concerning an object. This image information may include such data as parallax and colors. Projector lenses $31_1$, $31_2$ ... $31_6$ expand and project the beams passing through the positives $30_1$ ... $30_6$ onto a screen 16. This screen is identical with the lenticular reflection screen 16 shown in FIG. 5.

When each of the picture elements or positives $30_1$ to $30_6$ is expanded and projected onto the screen 16 through the projector lenses $30_1$ to $30_6$, the reflected beams take the form of fluxes $33_1$ to $33_6$. Each flux has a width determined by the diameter of the lenses $31_1$ to $31_6$. These strip shaped fluxes are independent of each other. The information carried by one strip of flux contains only the information from a single picture element or positive $30_1$ to $30_6$. A holographic recording medium 34 is positioned on one part of the plane 32. The coherent light beams 28 from the beam splitter 26 is projected by the lens 37 onto the medium as a reference beam.

Recording interference patterns formed by the projection along $31_1$ to $33_6$ produces a synthetic hologram with a single exposure. Mirrors 35 and 36 serve to bend the coherent beam 28. The lense 37, which is cylindrical lens, expands the coherent beam in one direction.

According to FIG. 7, the reference beam is projected on the front face. On the other hand when the reference beam is projected on the back face, a white beam reproduced hologram (volume hologram) is produced. In the volume hologram interference fringes corresponding to respective positives are arranged in a mosaic form, and the image is reconstructed by a white beam.

When the coherent beam is projected on the hologram, a reconstructed image is obtained. In order to make it possible to view this reconstructed image in three-dimensional structure, a positive photographed at a position of different parallax is used, and a hologram is produced with the spacing of a viewer's eyes.

In general, when a hologram is produced by closely spacing many positives, the three-dimensional observation zone is expanded.

The above embodiment utilizes a lenticular reflection screen. However, other types of screens, such as those shown in FIGS. 3, 4 and 6, may be used. However, in case of a screen in which a divergent beam from one point in the space is reflected or transmitted through the screen and then condensed back in that one point, it is necessary to use a half-mirror in the beam path and arrange a recording medium 34 on an equivalent condensing plane.

The hologram produced by the above example includes a Fresnel hologram, a lensless Fourier conversion hologram and a Fourier conversion hologram.

Figure 8:
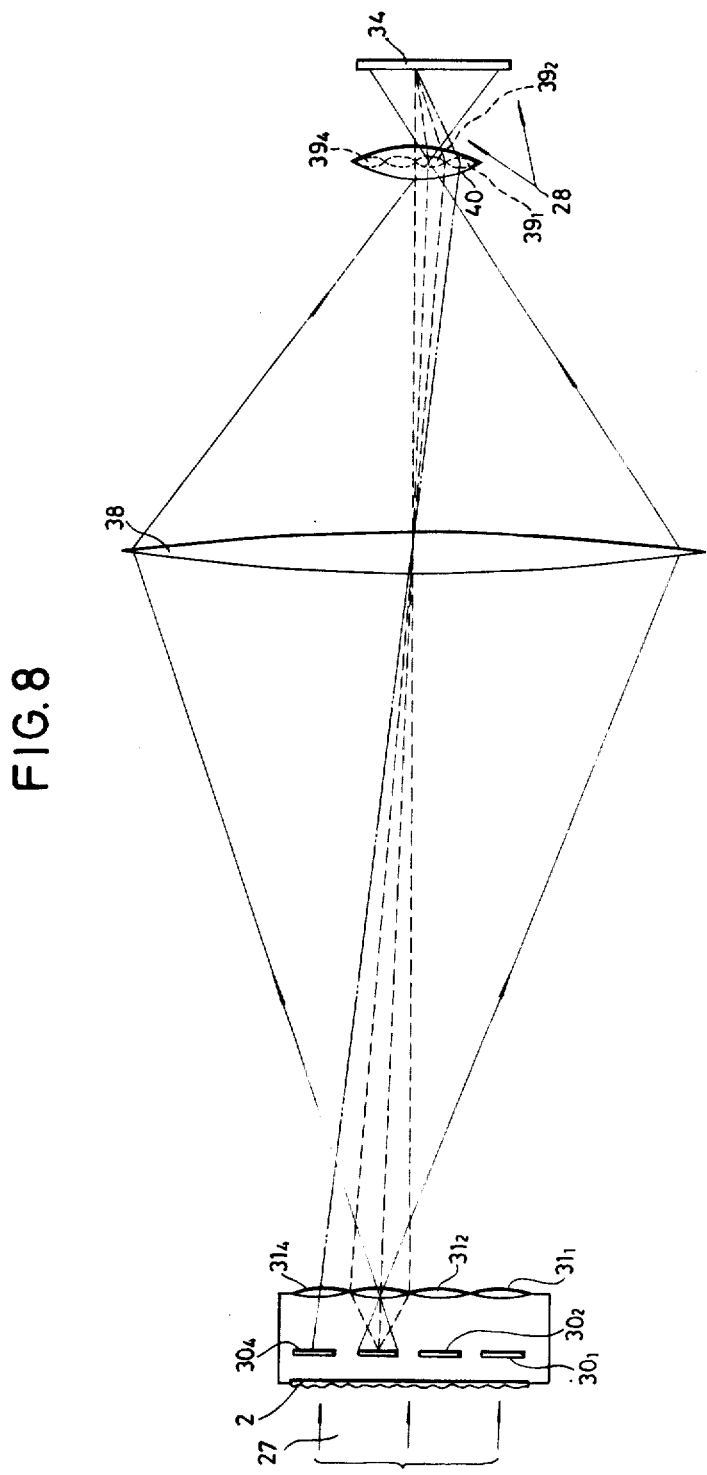
FIG. 8 shows a second embodiment of the present invention.

FIG. 8 show a second embodiment of the present invention. The major difference over the first embodiment is that the hologram so produced is a synthetic image hologram. The image hologram is produced by projecting positive information images which are image-formed by an image formation optical system.

The principal feature of the image hologram is that the reproduced beam has no color irregularity in spite of a limited wave length zone because the reconstructed image is on the hologram surface or near it. Thus, a single color light source such as laser is not always required. In order to obtain a reconstructed color image, for example, the hologram is produced with use of three laser beams of different colors, and a semi-single color beam of three colors taken out from an ordinary white beam light source by a color filter may be used for the reconstruction.

The second embodiment of the present invention will be explained by referring to FIG. 8. Positives $30_1$, $30_2$ . . . $30_4$ having different image information such as parallax and colors are expanded and projected on the screen 2 by a coherent beam 27 in a similar way as in FIG. 7. The numeral 38 denotes an apparatus functioning as a large aperture lens, by which conjugate images $39_1$, $39_2$ . . . $39_4$ of the projector lenses $31_1$, $31_2$ . . . $31_4$ are produced. An image formation optical system 40 is provided on a plane including these conjugate images. A recording medium 34 such as a dry plate is provided on the focal plane of the image formation optical system 40 or near it. The images of the positives $30_1$ . . . $30_4$ illuminated by the coherent beam are expanded and projected near the pupil plane of the screen 38. At this time the screen 38 forms images of the pupils of the projector lenses $31_1$ . . . $31_4$ on its conjugate positions $39_1$ . . . $39_4$. As the image formation optical system 40 is arranged in these conjugate positions $39_1$ . . . $39_4$, the optical system 40 forms the image on the screen 38 on the recording medium or near it. Thus by projecting the coherent beam 28, a synthetic hologram is produced. According to the present embodiment, a three-dimensional image can be easily monitored by adjusting the positives $30_1$ . . . $30_4$ or the projector lenses $31_1$ . . . $31_4$ to coincide with the positions of the projected images while observing the image on the screen 38, with the viewer's right and left eyes positioned at two positions among the conjugate images $39_1$ . . . $39_4$ of the projector lenses.

During reconstruction, when the hologram of FIG. 8 is illuminated by a wavefront conjugate to the reference beam, and the reconstructed real image is observed at the position of the conjugate image of the projector lens, the viewer can see the image on the screen 38. The observation may be done with the projector lenses $31_1$ . . . $31_4$ by using the screen 38 and the image formation optical system 40 in the production system. Reconstruction using the recording optical system permits correction of aberrations. It allows use even of a Fresnel lens having large aberrations, including color aberrations.

The invention makes possible recording of a synthetic hologram from which color images can be reconstructed. When the recording process uses the arrangement of FIGS. 7 and 8, a three-color coherent beam 27' is projected onto the positives $30_1$ to $30_6$. If a filter for separating the three colors is placed at right angles to the positives and in the position at which an image is produced on the screen, a color hologram is obtained. This color hologram is reconstructed by the inverse arrangement of the recording system.

In both of the first and second embodiments of the present invention, a reflection type lenticular screen or a large aperture lens screen is used.

However, the present invention can be used with any screen which, that when a plurality of information beams arranged separately are projected simultaneously, the reflected or transmitted information beams are separated again.

To provide image information positives are used in this embodiment. However, these can be replaced with an integral photograph taken by a hologram or a fly eye's lens. In that case, the projector lens is eliminated.

What is claimed is:

1. A method of producing a hologram, comprising:
   arranging a plurality of two-dimensional pictures in a predetermined pattern,
   illuminating each of the two-dimensional pictures with a coherent light beam,
   projecting light emerging from each of said two-dimensional pictures toward a screen so as to form overlapping images of the two-dimensional pictures on the screen,
   dispersing the light on the screen in a first direction parallel to the screen and redirecting the light on the screen along predetermined courses in a second direction orthogonal to the first direction so as to separate the light on the screen from the different pictures,
   directing the light from the different pictures from the screen onto a holographic recording medium so that light emerging from each of the two-dimensional pictures strikes a separate portion of the medium, and
   directing a reference beam toward the medium so as to produce interference with the light from the screen.

2. The method as in claim 1, wherein the step of dispersing and redirecting includes reflectively dispersing and retroreflectively redirecting the light on the screen.

3. The method as in claim 2, wherein the step of arranging the two-dimensional pictures includes arranging two-dimensional pictures representing information of the same object with different parallaxes.

4. The method as in claim 2, wherein the step of arranging includes arranging a plurality of two-dimensional pictures along a predetermined line.

5. The method as in claim 2, wherein the step of illuminating the picture elements includes illuminating the picture elements through a diffusion plate.

6. The method as in claim 2, wherein the step of dispersing and redirecting includes dispersing substantially all the light in one direction and redirecting all the light in a direction orthogonal thereto.

7. The method as in claim 2, wherein the step of dispersing and redirecting includes dispersing the light in radial directions and redirecting the light in circumferential directions.

8. A method of producing a hologram from a plurality of two-dimensional pictures which comprises:

arranging a plurality of two-dimensional pictures along a predetermined line, illuminating each of the two-dimensional pictures with a coherent light beam, projecting a plurality of images of the two-dimensional pictures to a first image forming optical system so as to obtain overlapping images of the two-dimensional pictures on the first image forming optical system by means of projector lenses, transferring said plurality of images of the two-dimensional pictures on the first image forming optical system to a holographic recording medium by means of second image forming system which is positioned on a plane where a plurality of images of the projector lenses are formed by the first image forming system, and directing a reference beam toward the medium so as to produce interference with a light from the plurality of the two-dimensional pictures.

9. A method as in claim 8, wherein the plurality of two-dimensional pictures is illuminated by coherent beams through diffusion plates.

* * * * *